(12) United States Patent
Lee (10) Patent No.: US 8,451,847 B2
(45) Date of Patent: May 28, 2013

(54) INTERMEDIATE NODE DEVICE, METHOD OF CONTROLLING INTERMEDIATE NODE DEVICE, AND NETWORK SYSTEM

(75) Inventor: Ji Hoon Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 12/637,812

(22) Filed: Dec. 15, 2009

(65) Prior Publication Data

US 2010/0238939 A1  Sep. 23, 2010

(30) Foreign Application Priority Data

Mar. 19, 2009 (KR) .................. 10-2009-0023491

(51) Int. Cl.
*H04L 12/28* (2006.01)
(52) U.S. Cl.
USPC ........................................... 370/400
(58) Field of Classification Search
None
See application file for complete search history.

(56) References Cited

U.S. PATENT DOCUMENTS

| 2003/0123419 A1* | 7/2003 | Rangnekar et al. | 370/338 |
| 2006/0056421 A1* | 3/2006 | Zaki | 370/400 |
| 2008/0162939 A1* | 7/2008 | Lee et al. | 713/171 |
| 2010/0110919 A1* | 5/2010 | Hischke et al. | 370/252 |

FOREIGN PATENT DOCUMENTS

| JP | 2004-158916 | 6/2004 |
| KR | 1020010062317 | 7/2001 |
| KR | 1020060015191 | 2/2006 |
| KR | 1020060092324 | 8/2006 |

* cited by examiner

*Primary Examiner* — Andrew Lai
*Assistant Examiner* — Leon Andrews
(74) *Attorney, Agent, or Firm* — NSIP Law (57) ABSTRACT

An intermediate node device, for which a method of control is provided and of which a provided network system includes a plurality, may receive a data packet from an upper intermediate node device and generate a first acknowledgement (ACK) message and a second ACK message with respect to the received data packet. Also, the intermediate node device may transmit the first ACK message to the upper intermediate node device, and transmit the second ACK message to an upper intermediate node device which is separated by a predetermined number of hops.

18 Claims, 4 Drawing Sheets

INTERMEDIATE NODE DEVICE, METHOD OF CONTROLLING INTERMEDIATE NODE DEVICE, AND NETWORK SYSTEM

CROSS-REFERENCE TO RELATED APPLICATION

This application claims the benefit under 35 U.S.C. §119 (a) of a Korean Patent Application No. 10-2009-0023491, filed on Mar. 19, 2009, in the Korean Intellectual Property Office, the entire disclosure of which is incorporated herein by reference for all purposes.

BACKGROUND

1. Field

The following description relates to a network system, an intermediate node device used in the network system, and a method of controlling the intermediate node device.

2. Description of the Related Art

A multi-hop transmission or a hop-by-hop transmission scheme may indicate a scheme of transmitting data from a source node to a destination node through at least one intermediate node.

In general, when data is transmitted between nodes, a node receiving data may transmit an acknowledgement (ACK) message to a node transmitting the data to report that the data transmission is successfully performed. Accordingly, reliability of data transmission may be ensured.

However, when data is transmitted from a source node to a destination node via a plurality of intermediate nodes using a multi-hop transmission scheme, the reliability of data transmission among nodes as well as the reliability of end-to-end data transmission, that is, the reliability that the data transmitted from the source node is appropriately received in the destination node, should be guaranteed as well.

SUMMARY

In one general aspect, an intermediate node device is provided. The intermediate node device may include a receiving unit configured to receive a data packet from a first upper intermediate node device adjacent to the intermediate node device, a message generation unit configured to generate a first acknowledgement (ACK) message and a second ACK message with respect to the received data packet, and a transmission unit configured to transmit the first ACK message to the first upper intermediate node device, and the second ACK message to a second upper intermediate node device which is separated from the intermediate node device by a predetermined number of hops.

The data packet may include a value of a counter field, and the predetermined number of hops is determined by the value of the counter field.

The message generation unit may generate the second ACK message when the receiving unit receives a data packet having a predetermined target value as the value of the counter field, and the transmission unit may transmit the second ACK message to the second upper intermediate node device separated by a number of hops indicated by the predetermined target value.

The message generation unit may generate the second ACK message when the receiving unit receives a data packet having the value of the counter field of '0', and the transmission unit may transmit the second ACK message to the second upper intermediate node device separated by a number of hops indicated by a predetermined initial value.

A network configured by the intermediate node device has an intermittent connection characteristic.

In another aspect, a network system transmitting data on a network is provided. The network system may include a source node device, a destination node device, and a plurality of intermediate node devices configured to sequentially relay a data packet transmitted from the source node device, and to transmit the data packet to the destination node device. The plurality of intermediate node devices may include a plurality of representative intermediate node devices, and each of the plurality of representative intermediate node devices may transmit an ACK message to a corresponding upper representative intermediate node device.

The data packet may include a value of a counter field, and the plurality of intermediate node devices may sequentially reduce the value of the counter field.

An intermediate node device receiving a data packet having the value of the counter field of '0' may be selected as any one of the plurality of representative intermediate node devices.

The data packet may include a value of a counter field, and the plurality of intermediate node devices may sequentially increase the value of the counter field.

An intermediate node device receiving a data packet having a predetermined target value as the value of the counter field may be selected as any one of the plurality of representative intermediate node devices.

In still another general aspect, a method of controlling an intermediate node device is provided. The method may include receiving a data packet from a first upper intermediate node device adjacent to the intermediate node device, generating a first ACK message and a second ACK message with respect to the received data packet, transmitting the first ACK message to the first upper intermediate node device, and transmitting the second ACK message to a second upper intermediate node device which may be separated from the intermediate node device by a predetermined number of hops.

The data packet may include a value of a counter field, and the predetermined number of hops may be determined by the value of the counter field.

The generating of the first ACK message and the second ACK message may generate the second ACK message when a data packet having a predetermined target value as the value of the counter field is received, and the transmitting of the second ACK message may transmit the second ACK message to the second upper intermediate node device separated by a number of hops indicated by the predetermined target value.

The generating of the first ACK message and the second ACK message may generate the second ACK message when a data packet having the value of the counter field of '0' is received, and the transmitting of the second ACK message may transmit the second ACK message to the second upper intermediate node device separated by a number of hops indicated by a predetermined initial value.

A network configured by the intermediate node device may have an intermittent connection characteristic.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
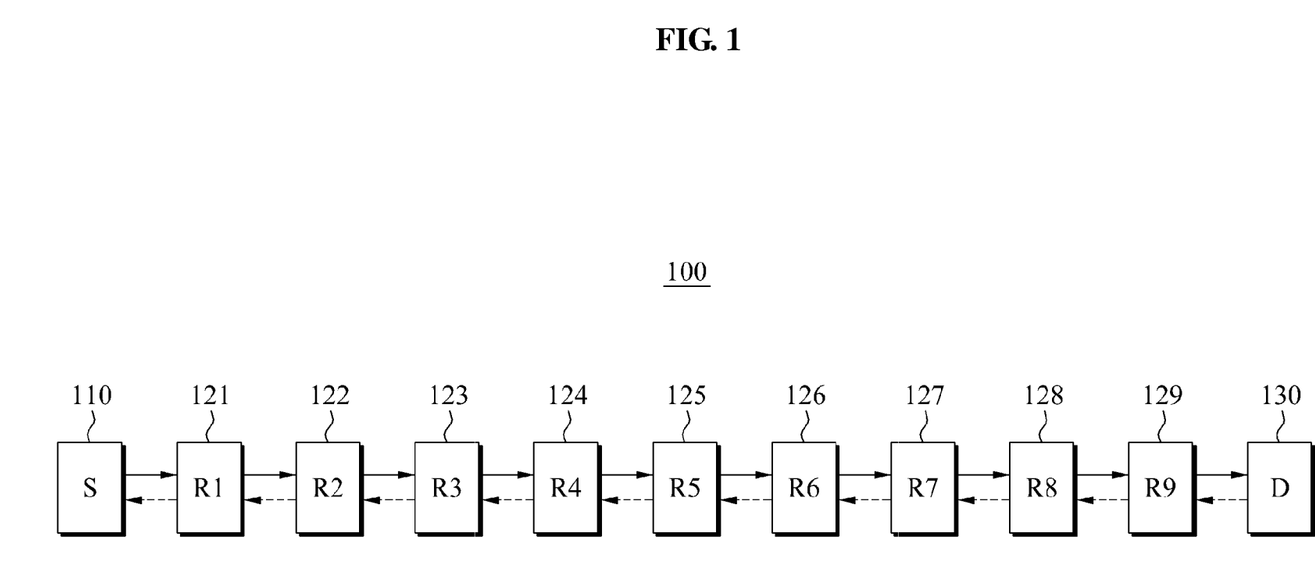
FIGS. 1 and 2 are diagrams illustrating an example of a configuration of a network system.
Figure 2:
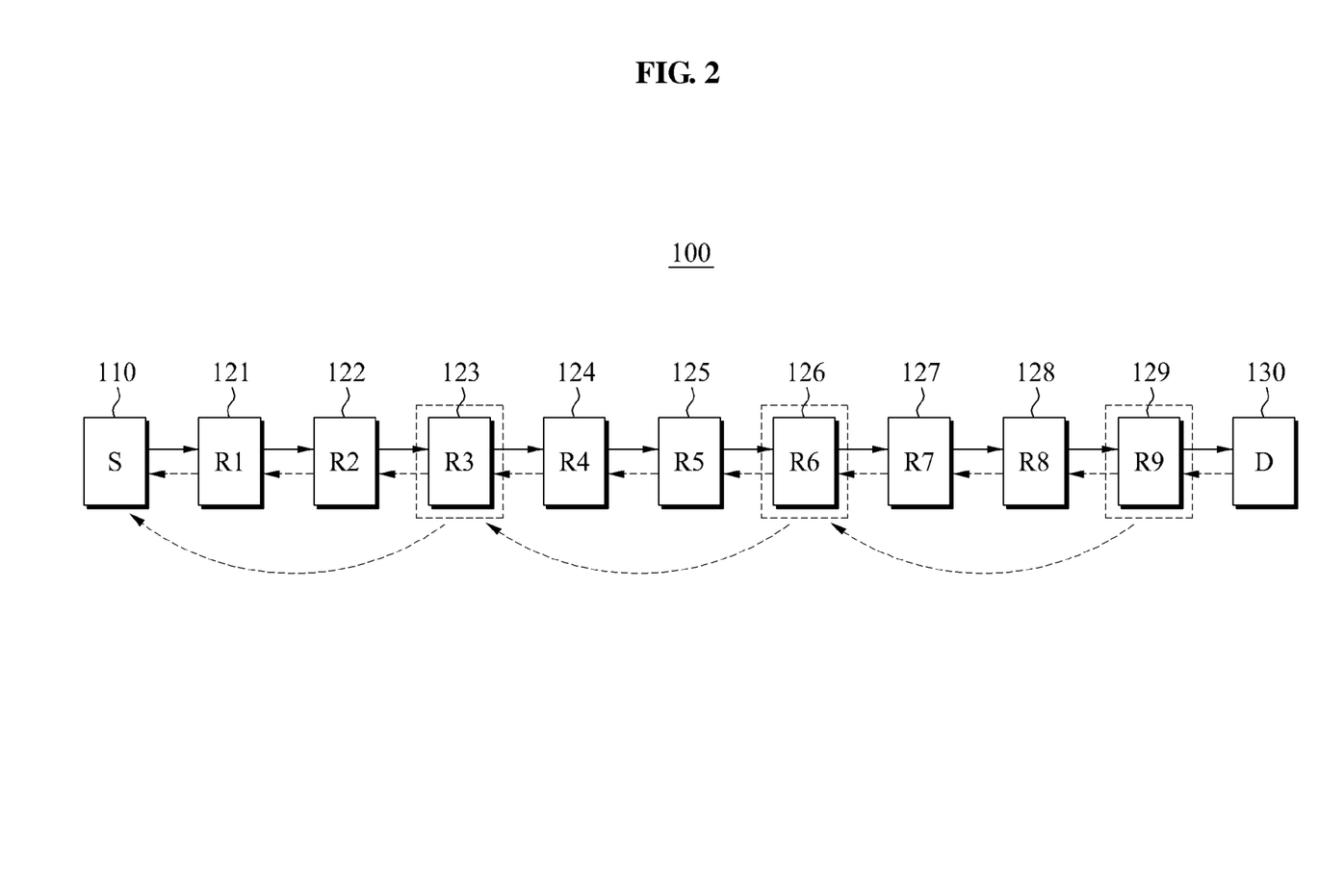

FIGS. 1 and 2 illustrate an example of a configuration of a network system.

The network system 100 may include a source node device 110, a plurality of intermediate node devices 121, 122, 123, 124, 125, 126, 127, 128, 129, and a destination node device 130.

Although nine intermediate node devices 121 through 129 are shown in FIGS. 1 and 2, it will be apparent to those skilled in the related art that a number of intermediate node devices included in the network system 100 may vary.

An operation of the network system 100 is described below with reference to FIG. 1.

The source node device 110 may transmit data to the destination node device 130. The source node device 110 may transmit the data, for example, in a unit of a packet or a different unit. Hereinafter, it may be assumed, as an example, that the data is transmitted for each packet from the source node device 110 to the destination node device 130. The data transmitted from the source node device 110 may reach the destination node device 130 through the plurality of intermediate node devices 121 through 129.

The plurality of intermediate node devices 121 through 129 may sequentially relay the data packet, transmitted from the source node device 110, and transmit the data packet to the destination node device 130 according to a hop-by-hop transmission scheme. In the hop-by-hop transmission scheme, each of the plurality of intermediate node devices 121 through 129 may receive the data packet and transmit the data packet to a subsequently lower intermediate node device of each of the plurality of intermediate node devices 121 through 129.

In this case, an intermediate node device receiving the data packet may transmit an acknowledgement (ACK) message to the upper intermediate node device transmitting the data packet, in order to report to the upper intermediate node device that the data packet transmission is successfully performed. Here, an upper intermediate node device of the intermediate node device 121 may be the source node device 110, and a lower intermediate node device of the intermediate node device 129 may be the destination node device 130.

For example, when the data packet is transmitted from the intermediate node device 122 to the intermediate node device 123, the intermediate node device 123 may generate and transmit the ACK message to the intermediate node device 122. Also, the intermediate node device 123 may transmit the received data packet to the intermediate node device 124.

When the data packet is transmitted according to the hop-by-hop transmission scheme in the network system 100, guaranteeing the data is transmitted for each hop may be accomplished through a hop-by-hop transmission of the ACK message, that is, each intermediate node device receiving the data transmits the ACK message to corresponding upper intermediate node device transmitting the data. However, the source node device 110 may not ascertain whether the destination node device 130 receives the data packet. Accordingly, it may not be guaranteed whether the end-to-end data transmission between the source node device 110 and the destination node device 130 is successfully performed.

FIG. 2 illustrates an example of an operation of the network system 100 that may guarantee the end-to-end data transmission.

The plurality of intermediate node devices 121 through 129 may include a plurality of representative intermediate node devices. In FIG. 2, it may be assumed, as an example, that an intermediate node device 123, an intermediate node device 126, and an intermediate node device 129 may be selected as the plurality of representative intermediate node devices from the plurality of intermediate node devices 121 through 129. Although it is described above that the network system 100 includes three representative intermediate node devices 123, 126, and 129, a number of representative intermediate node devices may vary depending on a network environment and be determined by a user.

The plurality of intermediate node devices 121 through 129 included in the network system 100 may be grouped into three intermediate node device groups. For example, the plurality of intermediate node devices 121 through 129 may be grouped into a first intermediate node device group, a second intermediate node device group, and a third intermediate node device group. The first intermediate node device group may include the intermediate node device 121, the intermediate node device 122, and the intermediate node device 123. The second intermediate node device group may include the intermediate node device 124, the intermediate node device 125, and the intermediate node device 126. The third intermediate node device group may include the intermediate node device 127, the intermediate node device 128, and the intermediate node device 129. Although it is described above that each of the intermediate node device groups includes three intermediate node devices, a number of intermediate node devices included in each of the intermediate node device groups may be determined by a user. A method of selecting a plurality of representative intermediate node devices from the plurality of intermediate node devices 121 through 129 is described below.

As illustrated in FIG. 2, a hop-by-hop transmission of an ACK message is similar to the hop-by-hop transmission in FIG. 1. However, different from FIG. 1, each of the representative intermediate node devices 123, 126, and 129 may generate another ACK message and transmit the generated ACK message to an upper representative intermediate node device to ensure the end-to-end data transmission. Hereinafter, an ACK message used to guarantee that the hop-by-hop transmission is successfully performed may be referred to as a first ACK message, and an ACK message used to guarantee that the end-to-end transmission is successfully performed may be referred to as a second ACK message.

Although it is illustrated in FIG. 2 that the second ACK message may be directly transmitted from each of the representative intermediate node devices 123, 126, and 129 to an upper representative intermediate node device of each of the corresponding representative intermediate node devices 123 and 126, the second ACK message may also be sequentially transmitted to an upper representative intermediate node device through a plurality of intermediate node devices existing among a representative intermediate node device and the upper representative intermediate node device.

When receiving the second ACK message transmitted by the representative intermediate node device, the upper representative intermediate node device may determine that a data packet transmission between the upper representative intermediate node device and the representative intermediate node device is successfully performed.

That is, when a data packet transmission is successfully performed in each of the first, second, and third intermediate node device groups where the representative intermediate node devices 123, 126, and 129 are included, each of the representative intermediate node devices 123, 126, and 129 may generate and transmit the second ACK message to the upper intermediate node device of each of the corresponding representative intermediate node devices 123 and 126. Accordingly, it may be reported that the data packet transmission is successfully performed in each of the first, second, and third intermediate node device groups.

For example, an operation of ascertaining whether a data packet transmission between the intermediate node device 127 and the intermediate node device 129 is successfully performed is described below.

When the representative intermediate node device 129 receives the data packet from the intermediate node device 128, the representative intermediate node device 129 may generate and transmit the first ACK message to the intermediate node device 128, and thereby may report that the hop-by-hop transmission is successfully performed. Also, the representative intermediate node device 129 may generate and transmit the second ACK message to the representative intermediate node device 126 which is an upper representative intermediate node device of the representative intermediate node device 129. Accordingly, it may be reported that a data packet transmission between the representative intermediate node device 129 and the intermediate node device 127 is successfully performed.

As an example, the network system 100 may group the plurality of intermediate node devices 121 through 129 into the plurality of intermediate node device groups, determine whether a data packet is transmitted for each of the intermediate node device groups, and thereby may guarantee reliability of the end-to-end data transmission.

As another example, each of the plurality of intermediate node devices 121 through 129 may generate and transmit the second ACK message to the source node device 110, and thereby may guarantee reliability of the end-to-end data transmission. In this example, however, a number of ACK messages transmitted to the source node device 110 may increase, and thus an overhead of the network system 100 may increase, and a storage process of the source node device 110 may increase due to an end-to-end network delay.

Accordingly, the network system 100 may group the plurality of intermediate node devices 121 through 129 into the plurality of intermediate node device groups, process an ACK message for each intermediate node device group, and thereby may reduce the overhead and the storage process of the source node device 110. Specifically, the first ACK message, which may be generated by a plurality of intermediate node devices and included in a particular intermediate node device group, may be processed by an upper representative intermediate node device of a representative intermediate node device included in the particular intermediate node device group.

For example, when the data packet transmission is successfully performed in the third intermediate node device group, the intermediate node device 129, which is a representative intermediate node device of the third intermediate node device group, may generate and transmit the second ACK message to the intermediate node device 126 which is an upper representative intermediate node device of the representative intermediate node device 129. The transmitted second ACK message may be processed by the intermediate node device 126. Similarly, the second ACK message, generated in the intermediate node device 126 which is a representative intermediate node device of the second intermediate node device group, may be processed by the intermediate node device 123 which is a representative intermediate node device of the first intermediate node device group.

A method of selecting a plurality of representative intermediate node devices from the plurality of intermediate node devices 121 through 129 is described below.

The source node device 110 may add a counter field to a data packet to be transmitted. Also, the source node device 110 may set an initial value and a target value with respect to a value of the counter field. The value of the counter field may be set in the counter field. The network system 100 may select the plurality of representative intermediate node devices from the plurality of intermediate node devices 121 through 129 depending on the value of the counter field. The value of the counter field may be included in a data packet.

The source node device 110 may transmit the data packet, including the value of the counter field, to the destination node device 130 sequentially through the plurality of intermediate node devices 121 through 129, and each of the plurality of intermediate node devices 121 through 129 may acquire the value of the counter field.

When the value of the counter field, included in the received data packet, is not identical to the target value, a corresponding intermediate node device may change the value of the counter field, and transmit the data packet including the changed value of the counter field to a lower intermediate node device.

When the value of the counter field, included in the received data packet, is identical to the target value, an intermediate node device may change the value of the counter field to the initial value, and transmit the data packet including the initial value to the lower intermediate node device. Thus, an intermediate node device, receiving a data packet including the target value identical to the value of the counter field, may be selected as the representative intermediate node device.

A first example and a second example are described as an example to select a plurality of representative intermediate node devices from a plurality of intermediate node devices.

1. A first example: When an initial value is '0' and a target value is a predetermined value.

An intermediate node device may ascertain whether a value of a counter field is identical to the predetermined target value. The value of the counter field may be included in a received data packet.

When the value of the counter field is identical to the predetermined target value, an intermediate node device receiving the data packet including the predetermined target value may be selected as a representative intermediate node device. The intermediate node device selected as the representative intermediate node device may change the value of the counter field to the initial value, and then transmit the data packet including the initial value to a lower intermediate node device.

When the value of the counter field is not identical to the predetermined target value, the intermediate node device may increase the value of the counter field, and transmit the data packet including the increased value of the counter field to the lower intermediate node device. That is, a plurality of intermediate node devices may sequentially increase the value of the counter field, until the value of the counter field is identical to the predetermined target value.

As illustrated in FIG. 2, for example, when the three intermediate node devices 123, 126, and 129 are selected from the plurality of intermediate node devices 121 through 129 as the representative intermediate node device, the initial value may be set as '0' and the target value may be set as '2'. Also, remaining intermediate node devices excluding the representative intermediate node devices 123, 126, and 129 may increase the value of the counter field by '1'.

2. A second example: When an initial value is a predetermined value and a target value is '0'.

An intermediate node device may ascertain whether a value of a counter field is 0. The value of the counter field may be included in a received data packet.

When the value of the counter field is 0, an intermediate node device receiving the data packet including the value of the counter field of '0' may be selected as a representative intermediate node device. The intermediate node device selected as the representative intermediate node device may change the value of the counter field to an initial value, and then transmit the data packet including the initial value to a lower intermediate node device.

However, when the value of the counter field is not 0, the intermediate node device may reduce the value of the counter field, and transmit a data packet including the reduced value of the counter field, to the lower intermediate node device. That is, a plurality of intermediate node devices may sequentially reduce the value of the counter field, until the value of the counter field is identical to the predetermined target value.

As illustrated in FIG. 2, for example, when the three intermediate node devices 123, 126, and 129 are selected from the plurality of intermediate node devices 121 through 129 as the representative intermediate node device, the initial value may be set as '2' and the target value may be set as '0'. Also, remaining intermediate node devices excluding the representative intermediate node devices 123, 126, and 129 may reduce the value of the counter field by '1'.

The network system 100 may be used on a network having an intermittent connection characteristic. For example, the network system 100 may be used on a Distribution/Delay Tolerant Network (DTN).

The network having the intermittent connection characteristic may indicate a network where node devices configuring the network may not be in constant communication with each other, unlike a general Internet network. That is, a communication among node devices may not be performed all the time in a network environment having the intermittent connection characteristic, and may be performed in a particular time period. The DTN may be the network having the intermittent connection characteristic.

The DTN may use a transmission model of a message-based overlay scheme based on a bundle protocol as opposed to a Transmission Control Protocol/Internet Protocol (TCP/IP)-based point-to-point protocol (PPP). In the DTN, asynchronous communication may be performed using a network/transmission layer protocol as opposed to TCP/IP.

Figure 3:
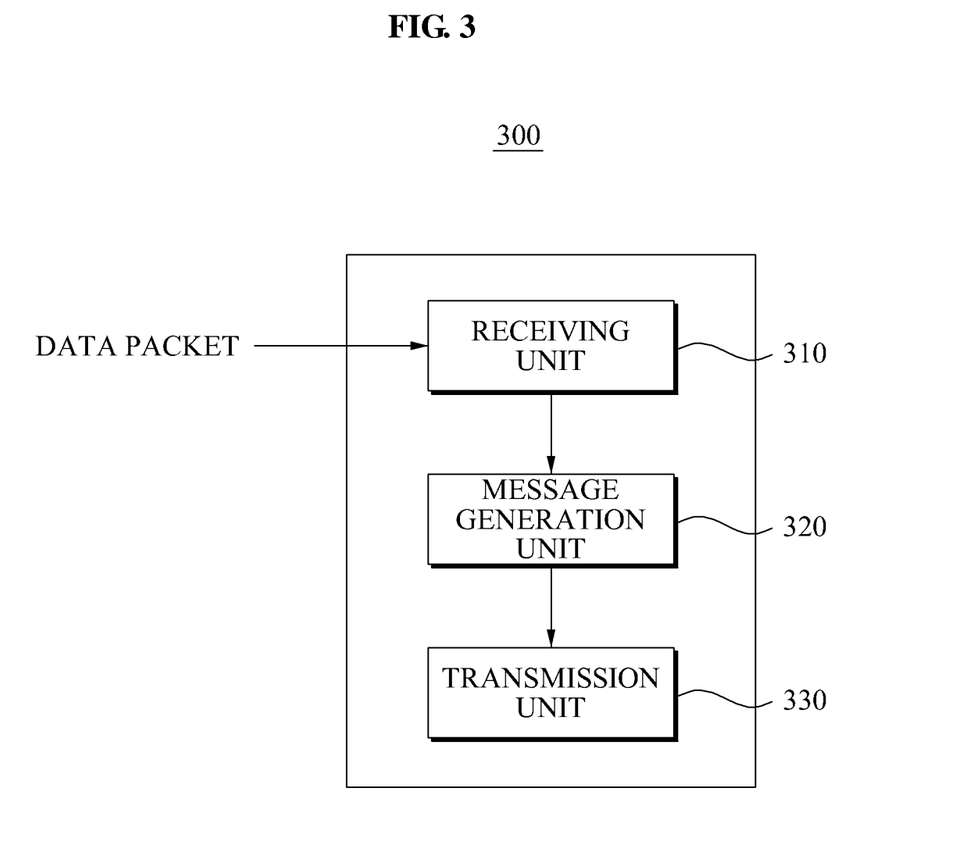
FIG. 3 is a diagram illustrating an example of a configuration of an intermediate node device.

FIG. 3 illustrates an example of a configuration of an intermediate node device 300.

The intermediate node device 300 may include a receiving unit 310, a message generation unit 320, and a transmission unit 330.

The intermediate node device 300 may be a device included in an intermediate node device described above with reference to FIGS. 1 and 2.

The receiving unit 310 may receive a data packet from a first upper intermediate node device adjacent to the intermediate node device 300.

The first upper intermediate node device may indicate an intermediate node device transmitting the data packet to the intermediate node device 300 according to a hop-by-hop transmission scheme.

The message generation unit 320 may generate a first ACK message and a second ACK message with respect to the received data packet.

The transmission unit 330 may transmit the first ACK message to the first upper intermediate node device, and the second ACK message to a second upper intermediate node device. The second upper intermediate node device may be separated from the intermediate node device 300 by a predetermined number of hops.

The second upper intermediate node device may be included in an upper representative intermediate node device described above with reference to FIGS. 1 and 2.

The data packet transmitted/received in the intermediate node device 300 may include a value of a counter field. The predetermined hop may be determined by the value of the counter field.

Accordingly, the message generation unit 320 may generate the second ACK message when the receiving unit 310 receives a data packet having a predetermined target value as the value of the counter field. Also, the transmission unit 330 may transmit the second ACK message to the second upper intermediate node device separated by a predetermined number of hops indicated by the predetermined target value.

As another example, the message generation unit 320 may generate the second ACK message when the receiving unit 310 receives a data packet having the value of the counter field of '0'. Also, the transmission unit 330 may transmit the second ACK message to the second upper intermediate node device separated by a predetermined initial value.

A network where the intermediate node device 300 is used may be a network having an intermittent connection characteristic. The network may be a DTN, for example.

Figure 4:
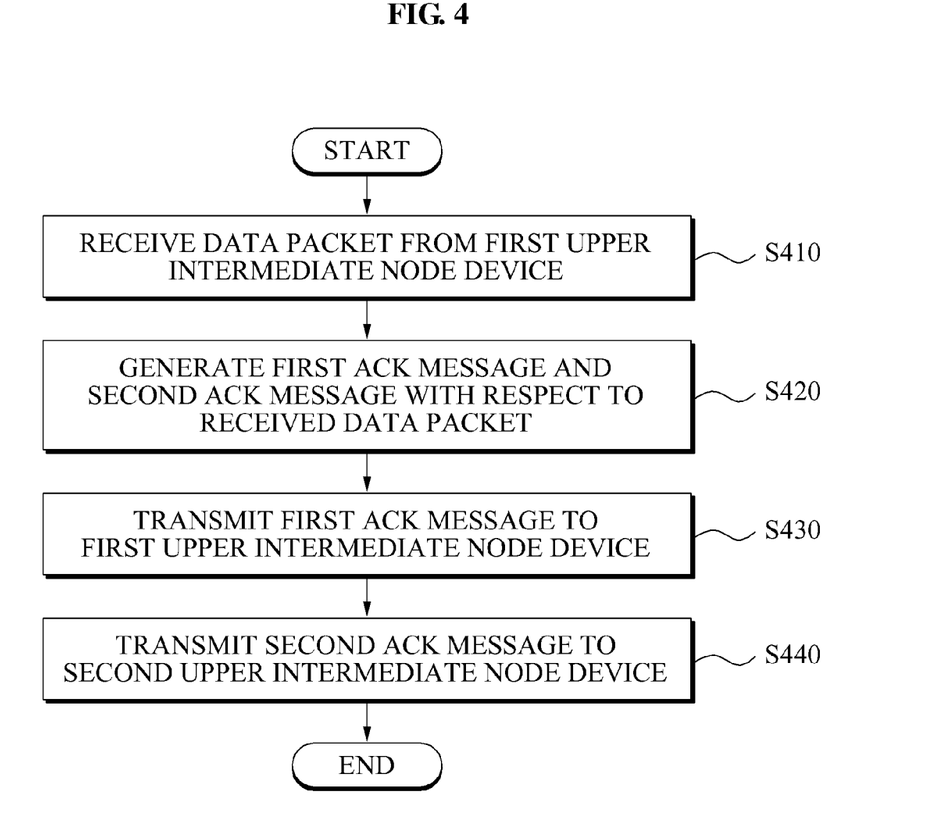
FIG. 4 is a flowchart illustrating an example of a control method of an intermediate node device.

FIG. 4 illustrates a method of controlling an intermediate node device, for example, an intermediate node device of FIG. 3.

In operation S410, a data packet may be received from a first upper intermediate node device adjacent to the intermediate node device.

In operation S420, a first ACK message and a second ACK message with respect to the received data packet may be generated.

In operation S430, the first ACK message may be transmitted to the first upper intermediate node device.

In operation S440, the second ACK message may be transmitted to a second upper intermediate node device which may be separated from the intermediate node device by a predetermined number of hops.

The method of controlling an intermediate node device has been described above with reference to FIG. 4. Further descriptions will be omitted herein for conciseness, since, for example, the method of controlling an intermediate node device may correspond to an operation and a configuration of the intermediate node device described with reference to FIG. 3.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media may include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-limiting illustration purpose only, a node in a communication network may be a connection point, either a redistribution point or a communication endpoint (some terminal equipment). For example, depending on the network and protocol layer referred to, a physical network node may be an active electronic device that is attached to a network, and is capable of sending, receiving, or forwarding information over a communications channel.

In data communication, a physical network node may either be a data circuit-terminating equipment (DCE) such as a modem, hub, bridge or switch; or a data terminal equipment (DTE) such as a digital telephone handset, a printer or a host computer, for example a router, a workstation or a server. If the network in question is a LAN or WAN, LAN or WAN node (that are at least data link layer devices) may have a MAC address. Examples are computers, packet switches and ADSL modem (with Ethernet interface). If the network in question is the Internet, many physical network nodes may be host computers, also known as Internet nodes, identified by an IP address, and for example, all hosts may be physical network nodes. If the network in question is a distributed system, the nodes may be clients, servers or peers. In a peer-to-peer or overlay network, nodes that actively route data for the other networked devices as well as themselves may be called supernodes.

In the fixed telephone network, a node may be a public or private telephone exchange, a remote concentrator or a computer providing some intelligent network service. In cellular communication, switching points and databases such as the Base station controller, Home Location Register, Gateway GPRS Support Node (GGSN) and Serving GPRS Support Node (SGSN) are examples of nodes.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An intermediate node device, comprising:
a receiving unit configured to receive a data packet from a first upper intermediate node device adjacent to the intermediate node device;
a message generation unit configured to generate a first acknowledgement (ACK) message and a second ACK message with respect to the received data packet; and
a transmission unit configured to transmit the first ACK message to the first upper intermediate node device, and the second ACK message to a second upper intermediate node device which is separated from the intermediate node device by a predetermined number of hops.

2. The intermediate node device of claim 1, wherein the data packet includes a value of a counter field, and the predetermined number of hops is determined by the value of the counter field.

3. The intermediate node device of claim 2, wherein the message generation unit generates the second ACK message when the receiving unit receives a data packet having a predetermined target value as the value of the counter field, and the transmission unit transmits the second ACK message to the second upper intermediate node device separated by a number of hops indicated by the predetermined target value.

4. The intermediate node device of claim 2, wherein the message generation unit generates the second ACK message when the receiving unit receives a data packet having the value of the counter field of '0', and the transmission unit transmits the second ACK message to the second upper intermediate node device separated by a number of hops indicated by a predetermined initial value.

5. The intermediate node device of claim 1, wherein a network configured by the intermediate node device has an intermittent connection characteristic.

6. A network system transmitting data on a network, the network system comprising:
a source node device;
a destination node device; and
a plurality of intermediate node devices, each of the intermediate node devices configured to:
sequentially relay a data packet to the destination node device, the data packet being transmitted originally from the source node;
generate first acknowledgment (ACK) messages with respect to the sequentially relayed data packet; and
transmit the first ACK messages to one of:
an adjacent upper one of the intermediate node devices; and
the source node device,
wherein the plurality of intermediate node devices includes a plurality of representative intermediate node devices, each of the representative intermediate node devices being configured to transmit a second ACK message to one of a corresponding upper one of the representative intermediate node devices and the source node device, the one of the corresponding upper one of the representative intermediate node devices and the source node device being separated by a predetermined number of hops from the representative intermediate node device that sent the second ACK message.

7. The network system of claim 6, wherein the data packet includes a value of a counter field, and the plurality of intermediate node devices sequentially reduces the value of the counter field.

8. The network system of claim 7, wherein an intermediate node device receiving a data packet having the value of the counter field of '0' is selected as any one of the plurality of representative intermediate node devices.

9. The network system of claim 6, wherein the data packet includes a value of a counter field, and the plurality of intermediate node devices sequentially increases the value of the counter field.

10. The network system of claim 6, wherein an intermediate node device receiving a data packet having a predetermined target value as the value of the counter field is selected as any one of the plurality of representative intermediate node devices.

11. A method of controlling an intermediate node device, the method comprising:
   receiving a data packet from a first upper intermediate node device adjacent to the intermediate node device;
   generating a first acknowledgement (ACK) message and a second ACK message with respect to the received data packet;
   transmitting the first ACK message to the first upper intermediate node device; and
   transmitting the second ACK message to a second upper intermediate node device which is separated from the intermediate node device by a predetermined number of hops.

12. The method of claim 11, wherein the data packet includes a value of a counter field, and the predetermined number of hops is determined by the value of the counter field.

13. The method of claim 12, wherein the generating of the first ACK message and the second ACK message comprises generating the second ACK message when a data packet having a predetermined target value as the value of the counter field is received, and the transmitting of the second ACK message comprises transmitting the second ACK message to the second upper intermediate node device separated by a number of hops indicated by the predetermined target value.

14. The method of claim 12, wherein the generating of the first ACK message and the second ACK message comprises generating the second ACK message when a data packet having the value of the counter field of '0' is received, and the transmitting of the second ACK message comprises transmitting the second ACK message to the second upper intermediate node device separated by a number of hops indicated by a predetermined initial value.

15. The method of claim 11, wherein a network configured by the intermediate node device has an intermittent connection characteristic.

16. The intermediate node device of claim 1, wherein the transmission unit is further configured to transmit the second ACK message directly to the second upper intermediate node device.

17. The network system of claim 6, wherein each of the representative intermediate node devices is configured to transmit the second ACK message directly to the one of the corresponding upper one of the representative intermediate node device and the source node device.

18. The method of claim 11, wherein the second ACK message is transmitted directly to the second upper intermediate node device.

* * * * *